US009268997B2

(12) United States Patent
Sheth et al.

(10) Patent No.: US 9,268,997 B2
(45) Date of Patent: Feb. 23, 2016

(54) METHODS AND SYSTEMS FOR INITIATING ACTIONS ACROSS COMMUNICATION NETWORKS USING HAND-WRITTEN COMMANDS

(71) Applicant: CELLCO PARTNERSHIP, Basking Ridge, NJ (US)

(72) Inventors: Abhishek Sumitra Sheth, Piscataway, NJ (US); Lauren Chin, Matawan, NJ (US); John Michael Butterfield, Hoboken, NJ (US); Zachariah Eamon Nelson, Somerset, NJ (US); Rita Sadhvani, Watchung, NJ (US); Robert M. Miller, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 293 days.

(21) Appl. No.: 13/958,288

(22) Filed: Aug. 2, 2013

(65) Prior Publication Data
US 2015/0036928 A1    Feb. 5, 2015

(51) Int. Cl.
*G06K 9/00* (2006.01)
*G06F 3/01* (2006.01)
*G06Q 10/10* (2012.01)

(52) U.S. Cl.
CPC .............. *G06K 9/00442* (2013.01); *G06F 3/01* (2013.01); *G06Q 10/109* (2013.01)

(58) Field of Classification Search
CPC ....................................................... G06K 9/00
USPC ....................................................... 382/187
See application file for complete search history.

(56) References Cited

U.S. PATENT DOCUMENTS

| 2005/0220344 | A1* | 10/2005 | Akiyama ...................... 382/187 |
| 2012/0302167 | A1* | 11/2012 | Yun et al. ..................... 455/41.2 |
| 2013/0151956 | A1* | 6/2013 | Allen ............................ 715/256 |
| 2013/0205220 | A1* | 8/2013 | Yerli ............................. 715/748 |
| 2014/0015776 | A1* | 1/2014 | Kim et al. ..................... 345/173 |
| 2014/0095348 | A1* | 4/2014 | Goulart ........................ 705/26.8 |
| 2014/0126823 | A1* | 5/2014 | St. Jacques et al. .......... 382/187 |
| 2014/0347328 | A1* | 11/2014 | Edgecomb et al. .......... 345/179 |

OTHER PUBLICATIONS

Boogie Board LCD eWriters Say Goodbye to Paper (5 pages), retrieved from http://www.improvelectronics.com/resources/brochures/Boogie-Board-LCD-eWriters-Product-Brochure-2013.pdf on Aug. 2, 2013.

(Continued)

*Primary Examiner* — Stephen R Koziol
*Assistant Examiner* — Delomia L Gilliard

(57) ABSTRACT

A method and system for providing hand-written command processing includes a network-connected application server receiving from a user device data storing hand-written information. The hand-written information is processed to identify one or more hand-written characters included in the data. A determination is made as to whether the identified characters include a command for initiating an action across the communication network. Upon determining that the characters include a command, the application server automatically performs the action identified by the command across the communication network. The action can include generating and sending a messaging service message or an e-mail, creating a scheduled reminder, creating and storing a checklist or note, or retrieving a previously stored checklist or note, based on information included in the hand-written characters. The user device may be a tablet-type user device.

20 Claims, 9 Drawing Sheets

(56) References Cited

OTHER PUBLICATIONS

Boogie Board Jot 8.5 Say Goodbye to Paper (2 pages), retrieved from http://www.improvelectronics.com/resources/brochures/Boogie-Board-Jot-8-LCD-eWriter-Product-Profile.pdf on Aug. 2, 2013.

Boogie Board Sync 9.7 LCD eWriter (4 pages), retrieved from http://www.improvelectronics.com/products/boogie-board-sync-9.html on Aug. 2, 2013.

Livescribe :: Never Miss a Word, smartpen overview (1 page), retrieved from http://www.livescribe.com/en-us/smartpen/ on Aug. 2, 2013.

Livescribe :: Never Miss a Word, smartpen > sky overview: Your Words. Your Ideas. Any Time, Anywhere (2 pages), retrieved from http://www.livescribe.com/en-us/smartpen/wifi-smartpen/ on Aug. 2, 2013.

Livescribe :: Never Miss a Word, smartpen > sky feature: Features of the Sky Wifi Smartpen (3 pages), retrieved from http://www.livescribe.com/en-us/smartpen/wifi-smartpen/features.html on Aug. 2, 2013.

Livescribe :: Never Miss a Word, smartpen > evernote: Your notes in Evernote (1 page), retrieved from http://www.livescribe.com/en-us/smartpen/wifi-smartpen/evernote.html on Aug. 2, 2013.

Livescribe :: Never Miss a Word, smartpen > echo overview: Capture it. Replay it. Send it. (1 page), retrieved from http://www.livescribe.com/en-us/smartpen/echo/ on Aug. 2, 2013.

Livescribe :: Never Miss a Word, smartpen > echo feature: Never Miss a Word (1 page), retrieved from http://www.livescribe.com/en-us/smartpen/echo/features.html on Aug. 2, 2013.

Echo smartpen datasheet (1 page), retrieved from http://www.livescribe.com/en-us/media/pdf/Livescribe_Tech_Specifications.pdf on Aug. 2, 2013.

Sky Wifi Smartpen datasheet (1 page), retrieved from http://www.livescribe.com/en-us/media/pdf/Sky_Tech_Specifications.pdf on Aug. 2, 2013.

Boogie Board Rip Tablet User Guide (8 pages), retrieved from http://www.improvelectronics.com/support/user-manuals/Boogie-Board-Rip-Tablet-User-Guide.pdf on Aug. 2, 2013.

\* cited by examiner

METHODS AND SYSTEMS FOR INITIATING ACTIONS ACROSS COMMUNICATION NETWORKS USING HAND-WRITTEN COMMANDS

BACKGROUND

In recent years, networked communication services have expanded and increased in popularity, around the world. Many individuals use networked communication devices to communicate with others, to keep notes and a personal calendar, and to access archived content and the Internet. Individuals use mobile stations, such as cell phones and smart phones, to communicate using voice calls and mobile messaging services (e.g., text and/or multimedia messaging) and for data communications (e.g., web surfing and/or e-mail). Individuals also use other types of communication devices, such as personal computers and e-readers, for accessing the Internet, sending e-mails, updating personal calendars, and sending content to their own or others' mobile stations.

Households commonly use a whiteboard or other message board to write notes, share messages, and create reminders for themselves and other members of the household. Households also commonly use a wall calendar to keep track of appointments and share scheduling information between members of the household. Users create messages, reminders, notes and checklists on both the whiteboard and wall calendar by handwriting the information on the whiteboard or calendar. The hand-written information, however, is restricted to the whiteboard or calendar, and cannot readily be accessed by remote users, shared between users, or added to users' electronic devices and calendars. Indeed, the sharing of the hand-written information requires the information to be copied using a keyboard into a user's mobile station or communication device.

A need therefore exists for methods and devices that enable users, using hand-written communications and commands, to have the hand-written communications automatically shared with other devices across one or more communication networks.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
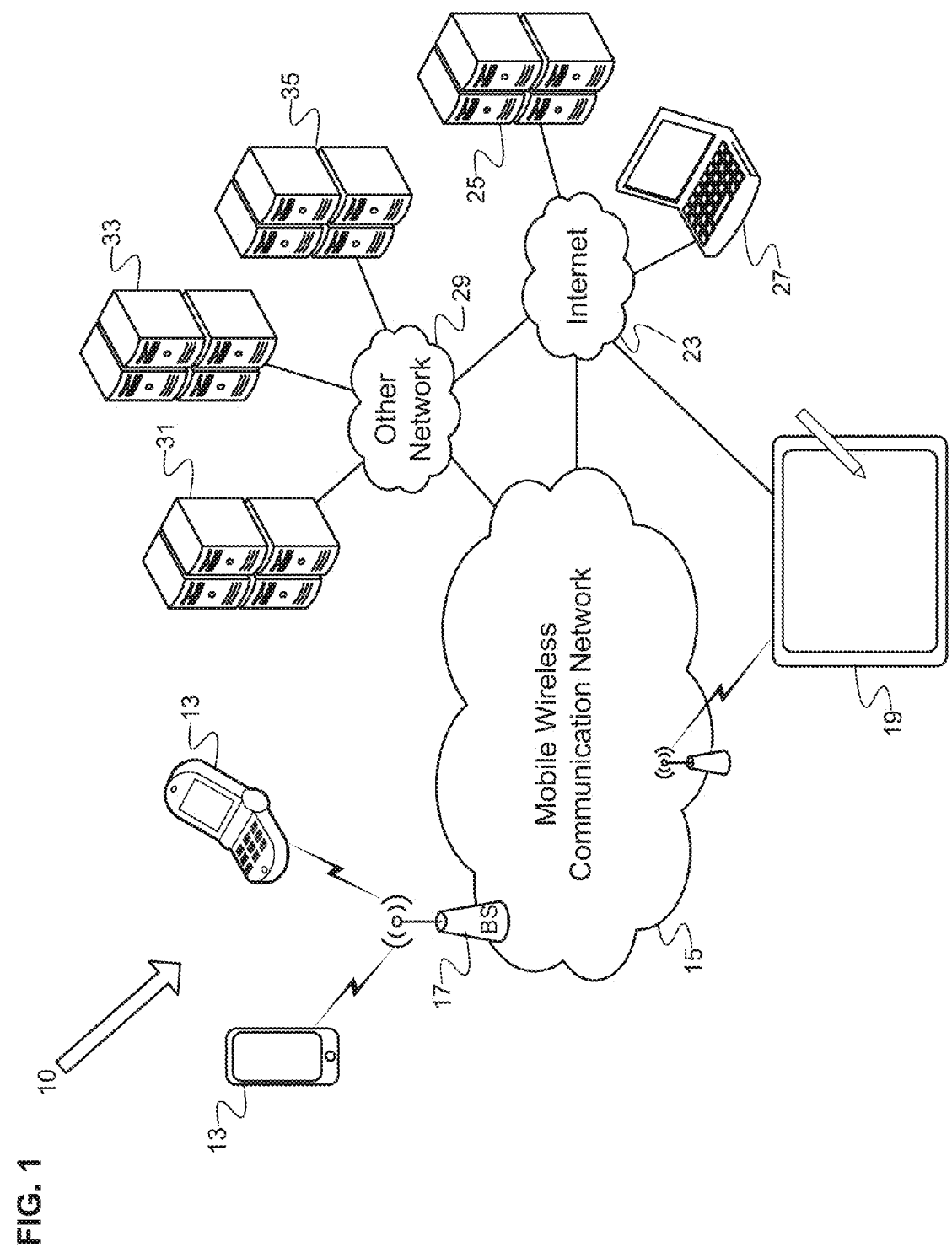
FIG. 1 is a high-level functional block diagram of a system of networks/devices that provide various communications for tablet-type user devices and application servers that implement the hand-written command processing service.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods and systems disclosed herein relate to initiating actions across communication networks using hand-written commands. The actions may involve generating and transmitting a user message across the communication networks based on a hand-written command, creating and storing a scheduled calendar reminder or a note based on the hand-written command, and/or retrieving a stored note or other content based on the hand-written command.

In one example, a user writes a message by hand on a tablet-type user device such as an electronic whiteboard mounted in the user's home. The hand-written message is captured as hand-writing input data by the user device, and is transmitted to an application server. The application server identifies hand-written characters (e.g., letters, numbers, and/or symbols) in the data, and determines whether the identified characters correspond to or include a command for performing an action. The application then performs the action, which may include generating and sending of a messaging service message or of an e-mail to recipient(s) identified by the handwriting; creating and optionally sharing with recipient(s) a scheduled reminder based on information included in the hand-writing; creating and storing a checklist or note based on the hand-writing; and/or retrieving a previously stored checklist or note identified in the hand-writing.

In particular, a method for causing an application server, communicatively coupled to a tablet-type user device through a communication network, to perform an action based on a hand-written command includes a step for receiving from the tablet-type user device data storing hand-written information. In response to receiving the data, the data is processed in the application server in order to identify one or more handwritten characters included in the data. In turn, it is determined whether the identified one or more hand-written characters include a command for initiating an action across the mobile wireless communication network. In response to determining that the identified characters include a command, the application server automatically performs the action identified by the command included in the hand-written characters across the mobile wireless communication network.

The actions automatically performed by the application server across the mobile wireless communication network can include one of (i) generating and sending a messaging service message, an e-mail, or the like, to at least one recipient identified by the one or more hand-written characters; (ii) creating an appointment or other scheduled reminder based on information included in the one or more hand-written characters, and sending of the created appointment or reminder to a calendar; (iii) creating and storing a checklist or note based on information included in the one or more handwritten characters; and (iv) identifying a checklist, note, or other content previously stored by the application server, based on information included in the one or more handwritten characters, and retrieving and sending of the identified content from the application server to the tablet-type user device.

Additionally, a method for processing hand-written information received from a user through a user-input interface of a tablet-type user device includes displaying of the handwritten information on the tablet-type user device. The data storing the hand-written information is transmitted from the tablet-type user device to an application server. In response to the transmission, a confirmation message including a command identified from hand-written characters included in the hand-written information is received in the tablet-type user device. At least a portion of the hand-written information displayed on the tablet-type user device is identified as corresponding to the hand-written characters from which the command is identified, and the identified portion is removed from display on the tablet-type user device.

Reference now is made in detail to the examples illustrated in the accompanying drawings and discussed below.

FIG. 1 illustrates a network system 10 offering a variety of communication services, including communications for linking a tablet-type user device 19 with an application server (25, 31) configured to interpret hand-written commands and perform actions based on the commands. The tablet-type user device 19 communicates with the application server (25, 31) through one or more networks (e.g., 15, 23, 29). In particular, the tablet-type user device 19 may communicate wirelessly via a mobile communication network 15, or through a wired or wireless (e.g., Wi-Fi) link via the Internet 23. The application server (25, 31) may be connected to the Internet 23 or to a private network 29. The actions performed by the application server (25, 31) generally involve causing communications to be transmitted to recipient mobile station(s) 13 through the mobile wireless communication network 15, and/or to the tablet-type user device 19 through the networks 15 and/or 23.

The example shows simply one tablet-type user device 19 for simplicity. However, the system 10 will generally provide communication and other services for many additional tablet-type user devices 19 communicating with the application server (25, 31), as well as for devices that do not participate in the hand-written command processing service. The present techniques may be implemented in any of a variety of available networks 15, 23, 29, and/or on any type of user device 19 compatible with such networks, and the drawing shows only a very simplified example of a few relevant elements of the system 10 for purposes of discussion. The networks 23 and 29 are packet-based data networks providing communication services to the tablet-type user devices 19, and the mobile wireless communication network 15 provides mobile wireless communications services via a number of base stations (BSs) 17 to compatible tablet-type user devices 19 and to mobile stations 13.

The tablet-type user device 19 can take the form of any computer or user device configured to receive hand-written user input. In the example shown in FIG. 1, the user device 19 is a tablet-type portable computer including a stylus for providing hand-written input data to the device 19 when a user writes on a display screen of the device 19. The table-type user device 19 may be a portable tablet or a tablet mounted on a refrigerator, a cabinet, a wall, or other location in which a whiteboard may be mounted, and may be used by members of a household to quickly jaunt down information. In other examples, the device 19 is a portable or desktop computer including a display and a user-input interface through which users can provide hand-written input data. The user-input interface may be built-in to the device 19 or may be a peripheral connected to the device 19, and can include a digitizing sketch pad, a digitizing pen, a touch-sensitive display or touch-sensitive track-pad, an electronic white board, or the like. In addition to a display and a user-input interface, the user device 19 includes a network communication interface including a transceiver. In some examples, the network communication interface includes a mobile wireless transceiver enabling user device 19 to communicate across the mobile communication network 15 through one or more base stations 17. In some examples, the network communication interface additionally or alternatively includes a wired or wireless transceiver for communicating via a wired or wireless (e.g., Wi-Fi) link with a packet data network such as the Internet 23.

The tablet-type user device 19 interfaces through the networks (15, 23, 29) with the application server (25 or 31) configured to provide the hand-written command processing service. The application server (25, 31) provides the hand-written command processing service based on hand-writing input data received across the networks (15, 23, 29) from the tablet-type user device 19. In particular, the application server (25, 31) processes the received input data to identify or extract characters from the data, and determines whether the identified characters include a command. The application server (25, 31) then performs an action corresponding to the command. For example, the application server (25, 31) may cause a messaging service message or an e-mail to be generated and sent to recipient(s) from the application server (25, 31) or from another server 35 (e.g., a messaging gateway server, an SMTP server, or the like). In another example, the application server (25, 31) may transmit a data communication to one or more mobile devices 13. In another example, the application server (25, 31) may retrieve data from storage, and transmit a data communication back to the user device 19 through the networks (15, 23, 29).

The application server (25, 31) additionally stores user data associated with each user device 19 connected thereto, including hand-writing input data received from each user device 19. The user data is generally stored in association with an identifier for the user device 19 from which the data was received, and is stored with a time-stamp indicative of a time at which the user data was created (e.g., a time at which the hand-writing input data was written onto the user device 19) and/or received by the application server (25, 31). The hand-writing input data can be stored as image file(s) representing the image(s) drawn on the user device 19, or as other appropriate type(s) of hand-writing input data. When the application server (25, 31) processes the hand-writing input data in order to identify characters and/or commands contained therein, the extracted characters and/or commands are stored by the application server (25, 31) in association with the hand-writing input data from which the characters and/or commands were extracted. The extracted characters and/or commands can be stored as metadata associated with the hand-writing input data, or stored in separate file(s).

In some example, the application server (25, 31) may provide additional services relating to the hand-written command processing service. In one example, the application server (25, 31) may provide either directly, or through one or more additional application servers (not shown), a web application for providing users with the ability to receive the hand-writing input data from a tablet-type user device 19 in real time (or near real-time). As such, the web application may enable a user accessing the web application through a mobile station 13 (e.g., through the use of a mobile application which communicates with the web application), a personal computer 27, or another tablet-type user device (not shown) to receive and visualize hand-writing and other content that is currently being written and/or displayed on the user device 19. In the example, users of the web application may themselves be able to write-on or otherwise edit the display of the user device 19, such that a two-way (or multi-way) interactive session can be established through the web application to enable multiple users (i.e., a user of the device, 19, and one or more user(s) of the web application) to concurrently share and edit a display screen. The web application can, for instance, enable two tablet-type user devices 19 to be linked together such that any hand-writing input on one user device 19 is caused to be displayed by the application server (25, 31) in real-time (or near real-time) on the other user device (not shown).

In other examples, the application server (25, 31) may provide either directly, or through one or more additional application servers (not shown), a variety of web applications providing other functionalities.

A first web application enables users to access stored content associated with a tablet-type user device 19. The first web application enables the users to retrieve hand-written content that was previously input through the tablet-type user device 19, for example to retrieve a note that was written on the user device 19 at a previous date/time and that has since been erased from the user device 19. The content can be retrieved by searching through metadata corresponding to stored hand-writing input data, searching by date, or the like. The metadata can include identification of the particular user device 19 from which hand-writing input data was received, timestamp(s) indicating when the hand-writing input data was obtained in the user device 19 (e.g., a time at which the information was written by the user on the device 19) and/or when the hand-writing input data was received in the application server, text data storing the characters and attributes identified from the hand-writing input, and information on any commands extracted from the characters and performed across the mobile wireless network.

A second web application may provide a calendar into which scheduled reminders associated with the user device 19 are recorded. The second web application may be synchronized with calendar(s) of user(s) associated with the user device 19, such as with calendars resident on mobile stations of members of a household that share the user device 19.

The mobile wireless communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. Mobile stations 13 and compatible user devices 19 are capable of data communications through the network 15, while certain mobile stations 13 and user devices 19 are additionally capable of voice and messaging communications through the network 15. The network 15 thus offers data communication services via the Internet 23, enabling stations 13 and devices 19 to communicate with web servers 25 and to perform downloads, web browsing, email, etc. The user devices 19 and mobile stations 13 can also receive and execute applications written in various programming languages.

Mobile stations 13 include portable handsets, smart-phones or personal digital assistants, although they may be implemented in other form factors. The mobile stations 13 are configured for voice, messaging, and data communication services across the network 15. Program applications, including messaging and email applications, calendar and scheduling applications, and applications for viewing and editing documents, can be configured to execute on the mobile stations 13.

The network communication system of FIG. 1 is implemented by a number of interconnected networks, including networks 15, 23, and 29 as well as other networks not shown in the figure. The wireless mobile communication network 15 can be operated by one of the mobile service providers or carriers. The carrier will also operate a number of systems that provide ancillary functions in support of the communications services and/or application services provided through the network system 10, and those elements communicate with other nodes or elements of the network system 10 via one or more private IP type packet data networks 29 (sometimes referred to as an Intranet), i.e. private networks. Generally, such systems are part of or connected for communication via the private network 29. Examples of such systems operated by the network service provider, which communicate through the intranet type network 29, include one or more application servers 31 and 35 and a related authentication server 33 for the application service of servers 31, 35.

A user device 19 communicates through a wired or wireless link via the network(s) 15, 23, and/or 29, to access application services offered by application servers 25, 31. If a mobile service carrier offers the hand-written command processing service, the service may be hosted on a carrier operated application server 31, for communication via the networks 15, 23, and/or 29 with a user device 19. Alternatively, the hand-written command processing service may be provided by a separate entity (alone or through agreements with the carrier), in which case, the service may be hosted on an application server such as server 25 connected for communication via the networks 15 and/or 23. Servers such as 25 and 31 may provide any of a variety of common application or service functions in support of or in addition to an application program running on the user device 19. However, for purposes of further discussion, we will focus on functions thereof in support of the mobile hand-written command processing service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the application server (server 31, in one example) receives a service request from a user device 19, the application server provides appropriate information to the authentication server 33 to authenticate the user device 19 as outlined herein. Upon successful authentication, the server 33 informs the application server 31, which in turn provides access to the service via data communication through the various communication elements (e.g., 15, 23, and 29) of the network system 10. A similar authentication function may be provided for hand-written command processing services offered via the server 25, either by the server 33 if there is an appropriate arrangement between the carrier and the operator of server 25, by a program on the server 25, or via a separate authentication server (not shown) connected to the Internet 23.

The communications between and functions performed by the application server (25, 31) and user device(s) 19 are discussed in more detail with reference to FIG. 2.

Figure 2:
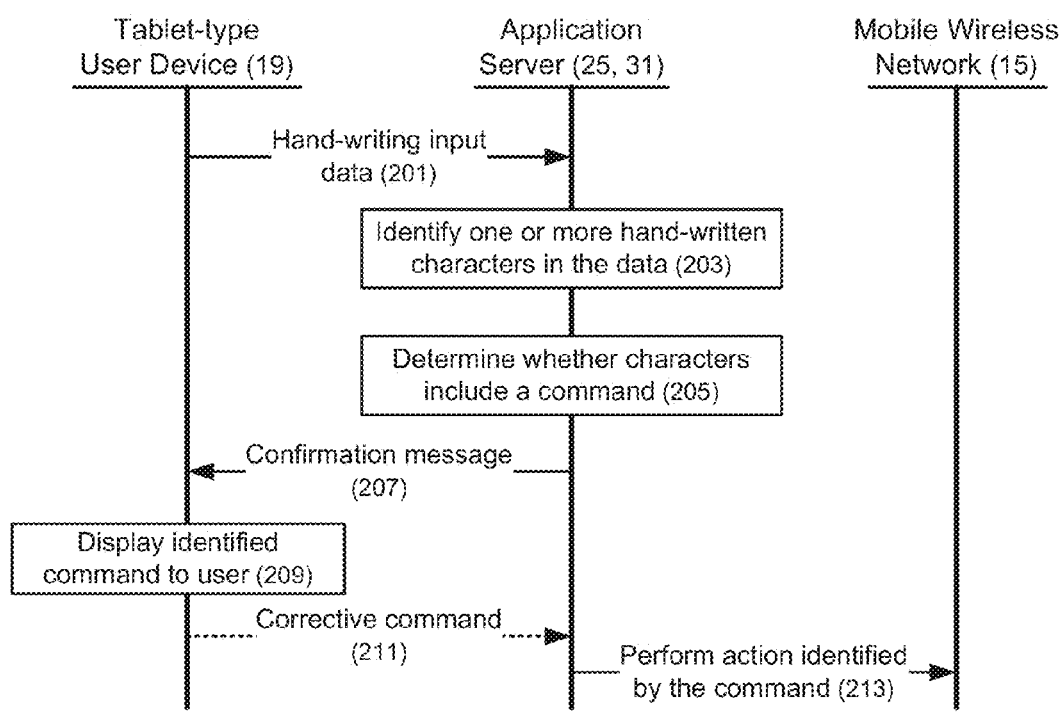
FIG. 2 is a communication flow diagram showing communications taking place between a tablet-type user device, an application server, and a mobile wireless communication network as part of providing the hand-written command processing service.

FIG. 2 is a communication flow diagram 200 outlining communications taking place between a tablet-type user device 19, the application server (25, 31), and the mobile wireless communication network 15 as part of providing the hand-written command processing service.

The flow of diagram 200 begins with the tablet-type user device 19 receiving hand-writing input data from a user. In general, the hand-writing input data is received by the user device 19 in real-time as a user writes on (or otherwise makes use of) a user-input interface of the device 19. The hand-writing input data generally is data written by hand by a user using a stylus, pen, or other similar implement. The hand-writing input data commonly includes hand-written characters such as letters (written in cursive or as block letters), numbers, and/or punctuation written in longhand by a user. In particular, the hand-writing input data generally does not include machine-written or machine-printed data, data entered using a keyboard or other keypad, or the like.

In response to receiving the hand-writing input data, the hand-writing input data is transmitted from the user device 19 to the application server (25, 31) for processing by the application server (25, 31) (step 201). The hand-writing input data is transmitted to the application server (25, 31) with a time-stamp corresponding to a time at which the hand-writing input data was generated in the user device 19. More specifically, the time-stamp may be indicative of a time at which the hand-writing input data was stored in the user device 19, which may correspond to a time at which input of the hand-writing input data into the user device 19 was completed. Alternatively, the time-stamp could be indicative of a time at which input of the hand-writing input data into the user device 19 was started. The hand-writing input data can additionally be transmitted with an identifier uniquely identifying the user device 19 on which the hand-writing input data was captured. The hand-writing input data is stored by the application server (25, 31) with the time-stamp in a location of memory associated with other input data received from the same user device 19. In general, the user device 19 stores a local copy of the hand-writing input data, and updates a display of the user device 19 in order to show the user's hand-writing.

In step 203, the application server (25, 31) processes the hand-writing input data received from the user device 19 in order to identify one or more hand-written characters in the data. The characters can include letters, numbers, punctuation, and other commonly used symbols (e.g., smiley face) in the data. The processing can additionally identify attributes associated with the characters, such as spacing (between characters on a line, and between lines of characters), underlining, the enclosing of character(s) (or of a string of characters) in a box, oval or other geometric figure, or the like. Once the characters and attributes are identified by the application server (25, 31), the application server (25, 31) stores the identified characters and attributes as metadata with the hand-writing input data that the characters and attributes were extracted from. The characters and attributes can alternatively be stored as a separate file (e.g., a text file) that is associated with the hand-writing input data is corresponds to. The application server (25, 31) may additionally identify hand-writing input data that does not correspond to any known characters or attributes as image data.

The processing of the hand-writing input data in step 203 may be performed repeatedly as new hand-writing input data is received. For example, a first hand-writing input data sample received from the user device 19 may be modified at a later time, and a second hand-writing input data sample including the modifications may then be received from the user device 19. In response to receiving the second hand-writing input data sample, the application server (25, 31) may repeat step 203 in order to identify any changes made to the hand-written characters, attributes, and/or image data previously identified from the first sample, in order to update the metadata or command data based on the second sample, and in order to repeat steps 205-213 based on the newly received second sample data.

Prior to processing the hand-writing input data in step 203, the application server (25, 31) may need to authenticate the user device 19. The authentication may be performed based on one or more authentication identifiers received from the user device 19, including one or more of a device serial number or other device identifier, a mobile identification number (MIN) or mobile device number (MDN), a username and/or password, an IP address or other communication address, or the like. The application server (25, 31) may provide the received authentication identifier(s) to an authentication server 33, and may receive an authentication confirmation in response to the authentication server 33 successfully authenticating the user device 19 based on the identifier(s). The application server (25, 31) may then proceed with processing of the hand-writing input data upon receiving the authentication confirmation. In one example, the authentication is performed based at least in part on hand-writing recognition. The authentication can thus be performed based on determining whether a sample of hand-writing input data received from the user device 19, such as a sample including a hand-written username and/or a hand-written password, matches a stored sample of hand-writing of a user of the device 19.

In step 205, the application server (25, 31) determines whether the characters and attributes identified from the hand-writing input data include a command. The command may be identified by a particular character or string of characters (e.g., the "@" character or the "@" character followed and/or preceded by the "#" character), a syntax of a string of characters (e.g., the "#" character placed at the beginning of a string and followed by numbers indicating a time), a character attribute (e.g., underlining), or the like. In one example, a command for sending a message to recipients begins with the "@" character followed, on the same line, by identification of the recipient(s) (e.g., "@John" or "@family"); a command for creating a scheduled reminder begins with the "#" character immediately followed by a time of day and/or date (e.g., "#7 am, August 6" or "#7:00 next Tuesday"); a command for creating a note or checklist begins with a title for the note or checklist that is underlined (e.g., "shopping list"); and a command for retrieving a note or checklist from memory begins with the title for the note or checklist that is surrounded by a box.

In general, the command is followed by additional content that forms part of the body of the message/reminder/note/checklist, and may be written below and proximate to the command. The additional content includes the remaining characters extracted from the hand-writing input data, and can additionally include drawings or other non-character data identified in the input data. In the one example, the body of an SMS or e-mail is written below the "@" command, the title of a reminder is written below the "#" command, and contents of a note or checklist is written below the underlined title.

Prior to executing the command, the application server (25, 31) can optionally be configured to confirm the accuracy of the command with a user of the device 19. To this end, the application server (25, 31) can send a confirmation message to the user device 19 in step 207. The confirmation message includes identification of the command determined in step 205, and the additional content extracted from the handwriting input data. The confirmation message can additionally be used to confirm with the user that data identified as image data within the hand-writing input data does not contain any characters or commands. To this end, a confirmation message including the image data can be generated and sent to the user device 19 in step 207. The confirmation message can further include identification of the hand-writing input data from which the command and additional content were extracted (i.e., identification of a particular portion of hand-writing input data, such as hand-writing input data generated by the user device 19 and given particular time-stamp(s)).

Upon receipt of the confirmation message, the user device 19 displays the received information to a user of the device 19 in step 209. For example, the command determined in step 205, and optionally the additional content extracted from the hand-writing input data and associated with the command, is shown on the display of the user device 19 for confirmation by the user. If the user determines that the command and additional content are correct, no action needs to be taken.

However, if the user determines that the command or the additional content are incorrect or include one or more errors, the user provides a corrective input to the user device 19. The corrective input can take the form of an erasing operation performed on the displayed command and/or additional content, for example by the user using an eraser end of a stylus or using a sweeping hand gesture. In response to the corrective input, the user device 19 generates and transmits a corrective command to the application server (25, 31) indicating to the application server (25, 31) that the command is incorrect (step 211).

Following the transmitting of the confirmation message (step 207), the application server (25, 31) waits a predetermined period of time for receipt of a corrective command. For example, the application server (25, 31) waits 30 seconds. The user device 19 may display a countdown timer indicating the time remaining until a corrective command is no longer accepted and a pause command allowing the user to pause (and subsequently restart) the timer. If a corrective command is received during the predetermined period of time, the application server (25, 31) does not perform the command. However, if no corrective command is received during the predetermined period of time, operation proceeds to step 213. If a pause command is received from the user, the application server (25, 31) extends the predetermined period of time until a restart command is received from the user.

In step 213, the application server (25, 31) performs the action identified by the command and provides feedback to the user device 19 so that the user device 19 may subsequently display an indication that the command has been performed. In a first example, the action involves transmitting a messaging service message or an e-mail. In the first example, the application server (25, 31) sends the messaging service message to a messaging gateway server (e.g., server 35) for transmission to recipients, and/or send the e-mail to an SMTP server (e.g., server 35) for transmission to recipients. The application server (25, 31) may additionally consult an address book stored in memory, and associated with the particular user device 19 from which the input data was received, in order to retrieve a telephone number or an e-mail address for the recipient(s) (or group(s) of recipient(s)) identified by the command. The messaging service message and/or e-mail are then sent following retrieval of appropriate telephone number(s) or e-mail address(es) from the address book.

In a second example, the action involves creating a scheduled reminder based on information included in the hand-writing input data. In the second example, the application server (25, 31) may consult a calendar stored in memory and associated with the particular user device 19 from which the input data was received, in order to determine whether the created reminder conflicts with any scheduled items already included in the calendar. The application server (25, 31) may further share the reminder with recipient(s) identified in the reminder in a manner similar to that described in the preceding paragraph.

In a third example, the action involves creating and storing a checklist or note based on information included in the hand-writing input data. In the third example, the note or checklist is stored in a memory location associated with the user device 19 from which the input data was received, and may be stored along with a time-stamp of a time of creation of the note or checklist. The note or checklist may also be provided to mobile station(s) of user(s) associated with the device 19, such as mobile station(s) of members of a household in which the user device 19 is located.

Finally, in a fourth example, the action involves searching for a checklist or note having the title identified in the command. The application server (25, 31) searches in the memory location associated with the user device 19 for checklists or notes having the same title. If no matching checklist or note is located in memory, the application server (25, 31) may return an error message to the user device 19 indicating the title which was searched for and the failure to locate a matching checklist or note. If a matching checklist or note is located in memory, the matching checklist or note is retrieved from memory and transmitted to the user device 19 for display to the user.

Figure 3A:
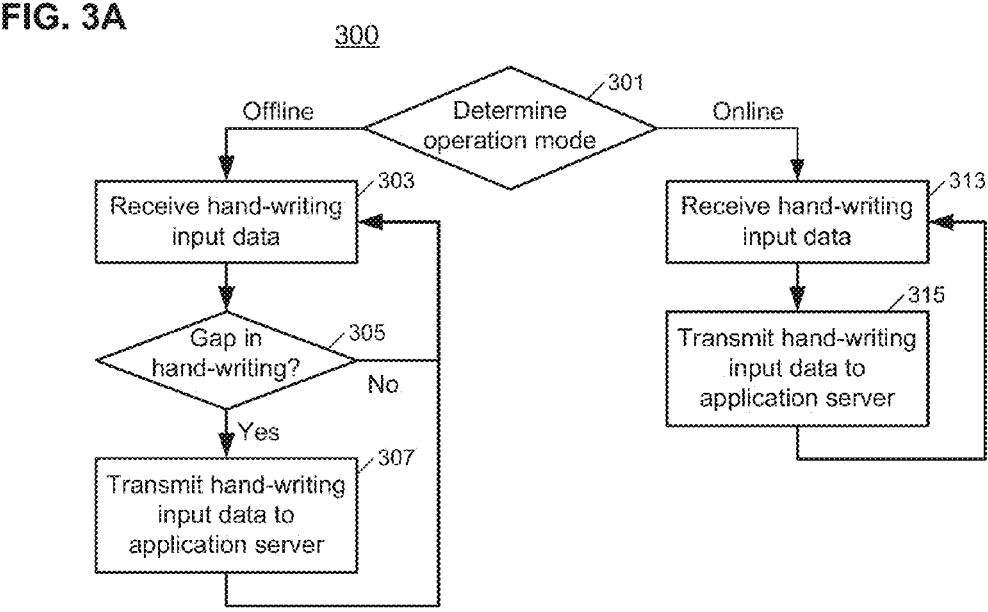
FIGS. 3A and 3B are flow diagrams of functions performed in a tablet-type user device as part of providing the handwritten command processing service.
Figure 3B:
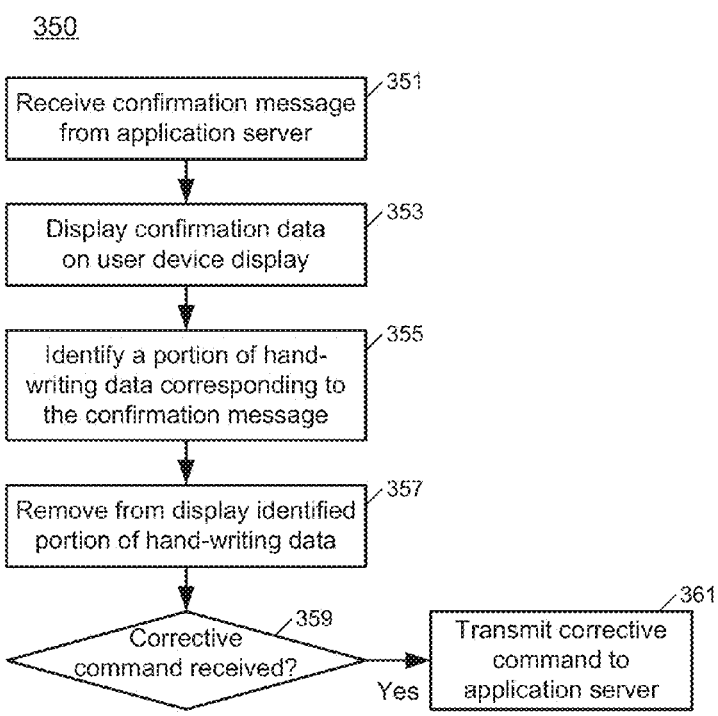

FIGS. 3A and 3B are flow diagrams of functions performed in the user device as part of providing the hand-written command processing service. FIG. 3A is a flow diagram of a method 300 performed when hand-writing input data is newly received from an input interface of the user device 19. FIG. 3B is a flow diagram of a method 350 performed in response to receiving a confirmation message from the application server (25, 31).

The method 300 begins in step 301 with a determination of whether the user device 19 is operating in the offline mode of operation or in the online mode of operation. The mode of operation of the user device 19 is generally set by the application server (25, 31). For example, the application server (25, 31) can transmit a control message to the user device 19 in order to cause the user device 19 to operate in the offline mode, or to operate in the online mode. Alternatively, the user device 19 may prompt the application server (25, 31) for information on the current operation mode, and receive an indication of the current operation mode in response to the prompt. In general, the offline mode is the default mode of operation, and the application server (25, 31) receives the hand-writing data from the user device 19 with a short delay when operating in the offline mode. However, the application server (25, 31) causes the user device 19 to operate in the online mode when the application server (25, 31) needs to receive the hand-writing input data in real-time (or near real-time), such as when a user requests real-time monitoring of the user device 19. The real-time monitoring may be requested when a user accesses a web application providing the user with the ability to visualize in real-time (or near real-time) the hand-writing and other content that is currently being written and/or displayed on the user device 19. The user accessing the web application may be a user of another tablet-type user device, or a user of a mobile station, personal computer, or other device accessing the web application.

If the user device 19 determines that the current operation mode is the offline mode (step 301, "Offline"), the user device 19 monitors the hand-writing input interface for new handwriting input data. The user device 19 receives hand-writing input data from the input interface in real-time as a user writes on/with the input interface (step 303), and stores the received data in local memory. As the hand-writing input data is received, the user device 19 processes the data to determine when a gap in the hand-writing occurs (step 305). In general, the gap in the hand-writing occurs when no input is received from the user for a pre-determined amount of time, for example when no input is received for a 5 second period of time. Alternatively or additionally, a gap can be determined to occur when the user begins writing on a new line, or begins writing on a different portion of the display of the user device 19 than was previously being written on. The gap may coincide with the user having finished inputting a command, or finished inputting a segment (e.g., a line, a sentence, or other part) of a command. Similar to the above, the user device 19 may display a countdown timer indicating the time remaining in the gap and a pause command allowing the user to pause the timer. The timer may be automatically reset by the user again writing on the input interface.

As long as no gap is determined (step 305, "No"), the user device 19 continues to store and process received hand-writing input data (step 303). However, once a gap is determined (step 305, "Yes"), the user device 19 transmits the hand-writing input data to the application server (25, 31) in step 307. The user device 19 may transmit only the hand-writing input data which has been received since an immediately preceding gap in input (i.e., transmit only "new" data that has not previously been transmitted to the server). Alternatively, the user device 19 may transmit all of the hand-writing input data that is currently displayed on the user device 19. The user device 19 may identify, in the transmitted hand-writing input data, whether the hand-writing input data includes only new data (i.e., hand-writing input data that has not previously been transmitted to the application server (25, 31)) or a combination of new data and previously transmitted data. Once the data is transmitted, the user device 19 returns to step 303.

If the user device 19 determines that the current operation mode is the online mode (step 301, "Online"), the user device 19 monitors the hand-writing input interface for new hand-writing input data. The user device 19 receives hand-writing input data from the input interface in real-time as a user writes on/with the input interface or peripheral (step 313), and transmits the received hand-writing input data to the application server (25, 31) as it is received (step 315). As such, in the online mode, the hand-writing input data is transmitted in real-time (or near real-time), such that the application server (25, 31) receives the input data continuously and as it is input by the user. In general, when operating in the online mode, the user device 19 only transmits hand-writing input data which has been received since a previous transmission of input data to the application server (i.e., transmit only "new" data that has not previously been transmitted to the server).

In accordance with method 350 of FIG. 3B, in response to transmitting hand-writing input data to the application server (25, 31), the user device 19 may receive confirmation messages including information on commands that were identified by the application server (25, 31) as having been entered by a user through the user device 19 (step 351). A confirmation message is received by the user device 19 for each command that is identified by the application server (25, 31) based on hand-writing input data received by the application server (25, 31) from the user device 19.

In response to receiving the confirmation message, the user device 19 displays information on the command received in the confirmation message on the display of the user device 19 (step 353). The information is displayed to enable a user to review the information and confirm its accuracy. The user device 19 may additionally identify a portion of hand-writing data that is currently displayed on the user device display and that corresponds to the same hand-writing data that is associated with the confirmation message (step 355). The identification of step 355 may be performed by identifying, among the hand-writing data currently displayed by the user device 19, the hand-writing data that has time-stamp(s) that match time-stamp(s) identified in the confirmation message received in step 351. The time-stamp(s) identified in the confirmation message identify the portion(s) of hand-writing data from which the command included in the confirmation data was extracted.

In response to the identification, the user device 19 may remove from display the identified portion of hand-writing data (step 357). In some examples, the user device 19 will cause the confirmation data to be displayed in step 353 at substantially the same location on the display of the user device 19 as the location where the identified portion of hand-writing data was previously displayed. The displaying of the confirmation data at the same location causes the hand-writing data to be effectively replaced with the corresponding command or extracted information.

Once displayed, a user of the device 19 reviews the confirmation data for accuracy. If the data is accurate, the user does not need to take any action. However, if the confirmation data is erroneous or inaccurate, the user can issue a corrective input to indicate that an error is present in the confirmation data. The corrective input can take the form of a user crossing out a portion of the displayed confirmation data using a stylus, or otherwise erasing the displayed confirmation data (e.g., using an eraser end of a stylus, or another erasing motion). If a corrective input is received (step 359), the user device 19 transmits a corrective command to the application server (25, 31) in step 361 so as to prevent the application server (25, 31) from performing any action identified by the erroneous/inaccurate command. The transmission of step 361 may, optionally, include hand-writing input data replacing or otherwise correcting the erroneous/inaccurate command.

Figure 4:
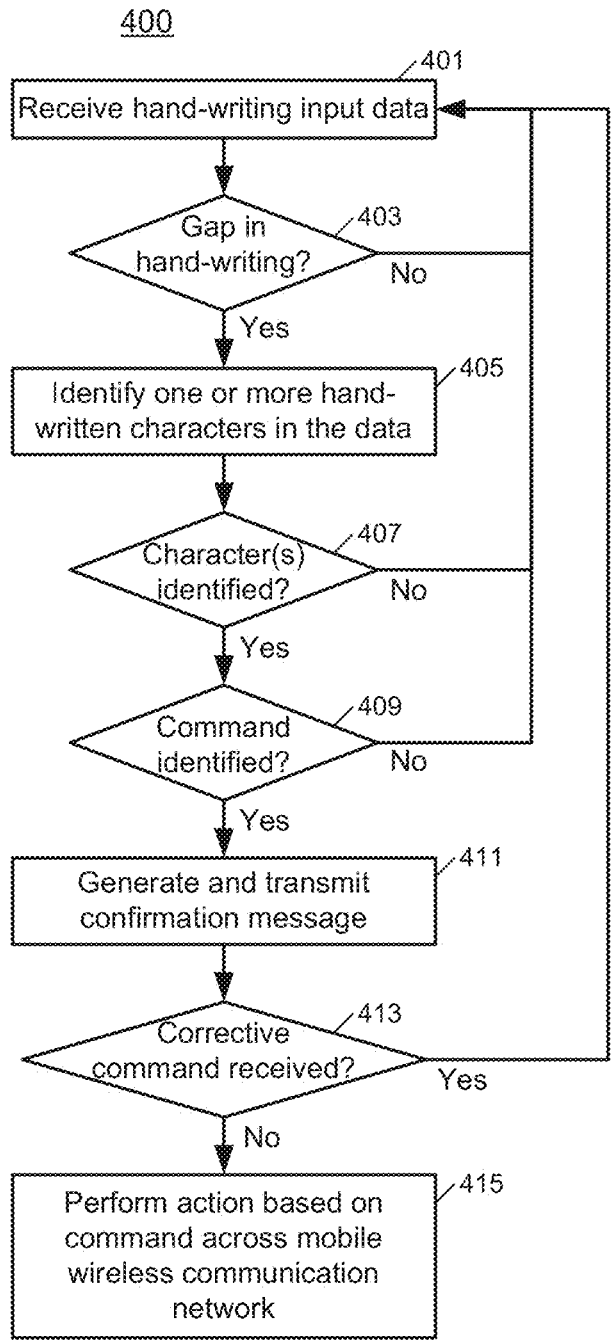
FIG. 4 is a flow diagram of functions performed in an application server as part of providing the hand-written command processing service.

FIG. 4 is a flow diagram illustratively showing functions performed in the application server (25, 31) as part of providing the hand-written command processing service. Specifically, FIG. 4 is a flow diagram of a method 400 performed when hand-writing input data is newly received in the application server (25, 31) from a user device 19.

Method 400 begins in step 401 with the application server (25, 31) receiving hand-writing input data from the user device 19. The received hand-writing input data is stored in memory in association with an identifier for the user device 19 from which the data was received. The hand-writing input data is received from the user device 19 in real-time (or near real-time) as a user writes when the user device 19 is in the online operation mode, and can be received after a short delay when the user device 19 is in the offline operation mode. When the hand-writing input data is received in real-time, the application server (25, 31) identifies gap(s) in hand-writing in step 403. Step 403 is similar to step 305 of method 300, and reference can be made to the description of step 305 for more detail. When a gap in the hand-writing input data has been identified by the application server (25, 31) in step 403, or by the user device 19 in step 305 and the corresponding hand-writing input data has been received by the application server (25, 31) in step 401, control passes to step 405.

In step 405, the application server (25, 31) processes the hand-writing input data received from the user device 19 in order to identify one or more hand-written characters in the data. In particular, the application server (25, 31) may process the hand-writing input data which has been received since an immediately preceding gap in input (as determined at step 403 or step 305), or process all hand-writing input data currently displayed on the user device 19, for example. The processing is used to identify characters (e.g., letters, numbers, punctuation, and other commonly symbols) and/or attributes (e.g., spacing, underlining, boxes, or the like). Portions of the hand-writing input data that do not corresponding to characters or attributes are identified and stored as images. In some examples, attributes may be used to modify characteristics of associated characters, for example to italicize, bold, or apply other characteristics to identified characters. In one example, double underlining of a character may cause the character to be bolded, and circling of a character (or group or string of characters) may cause the character to be italicized. In step 407, a determination is made as to whether any characters were identified in step 405. If no characters were identified, control passes to step 401 such that steps 401-405 can be repeated when additional hand-writing input data is received.

However, if one or more characters were identified in step 405, control passes to step 409 in which a determination is made as to whether any command can be identified among the received characters. If no command is identified, control passes to step 401 such that steps 401-407 can be repeated once additional hand-writing input data is received. However, if a command is identified, control passes to step 411 in which a confirmation message including the command is generated and transmitted to the user device 19. The confirmation message includes the command along with any additional content that follows the command. The additional content may include characters, attributes, and/or image data that forms part of the body of the message/reminder/note/checklist identified in the command.

Following the transmitting of the confirmation message, the application server (25, 31) waits a predetermined period of time for a corrective command to be received. If a corrective command is received (step 413, "Yes"), the identified command is not executed; instead, control returns to step 401 to determine a corrected or new command from the handwriting input data. If no corrective command is received prior to the expiration of the predetermined period of time (step 413, "No"), the application server performs the action identified by the command in step 415.

In addition to receiving corrective command(s) (e.g., in step 413), the application server (25, 31) may receive handwriting input data that modifies or adds to previously processed hand-writing input data at any time. Upon receiving hand-writing input data, the application server (25, 31) may thus determine whether the newly received data includes only new data (i.e., hand-writing input data that has not previously been received in the application server (25, 31)) or a combination of new data and previously received data (i.e., revised data). The determination may be made based on the user device 19 identifying hand-writing input data as "new" or "revised" data when the data is transmitted to the application server (25, 31). If the received hand-writing input data is identified as "new" data, the newly received data is processed on its own by the application server (25, 31) in steps 401-415. However, if the received hand-writing input data is identified as "revised" data, the application server (25, 31) identifies previously processed data that is associated with the newly received data, identifies differences between the previously processed data and the newly received data, and performs any processing required to update metadata, commands, or the like based on the identified differences.

FIGS. 5A-5D are drawings illustratively showing four use cases of the hand-written command processing service. Each use case shown in a respective one of FIGS. 5A-5D corresponds to a different type of command that may be included in the hand-writing input data.

Figure 5A:
FIGS. 5A-5D are drawings illustratively showing four use cases of the hand-written command processing service.
Figure 5A:
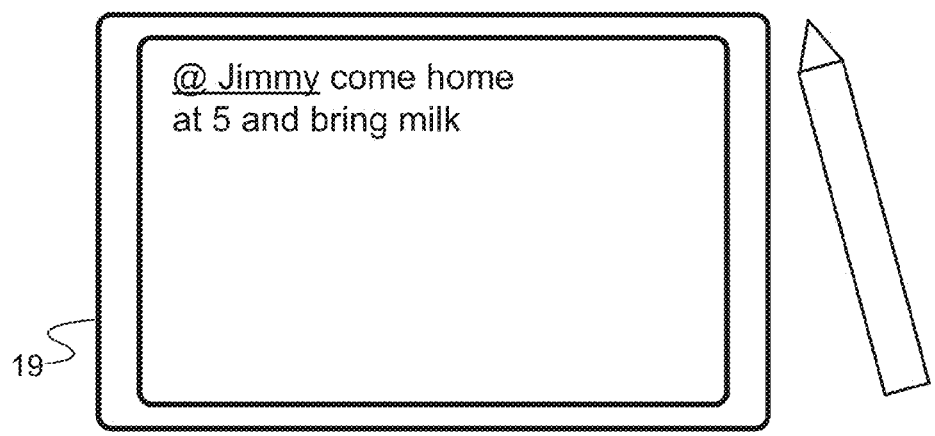
Figure 5A:

FIG. 5A shows a first example in which a hand-written command for sending a messaging service message or an e-mail. In a first instance, a user writes the command "@Jimmy" on the tablet-type user device 19, along with the message content "come home at 5 and bring milk." Input data storing the user's hand-writing is transmitted to the application server (25, 31) where the command and additional content are recognized. A confirmation message including the content "@ Jimmy come home at 5 and bring milk" is received from the application server (25, 31) at the user device 19, and is displayed on the user device 19 in a second instance. The user does not issue any corrective input and, as a result, the application server (25, 31) sends a new message to Jimmy's mobile station 13 identifying the sender of the message and including the message content written on the user device.

Figure 5B:
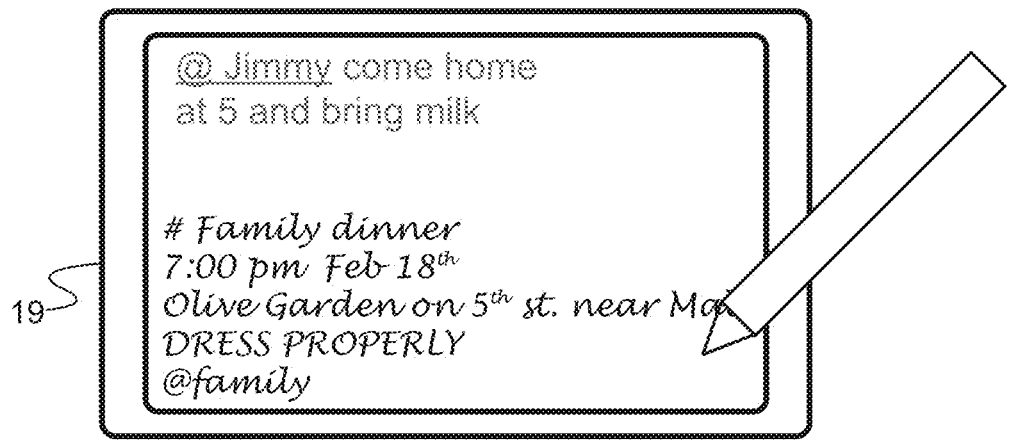
Figure 5B:
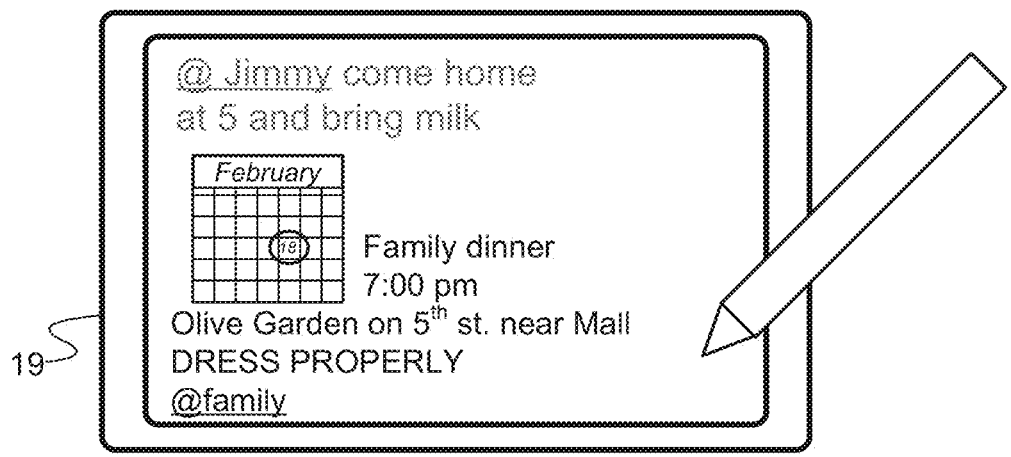
Figure 5B:
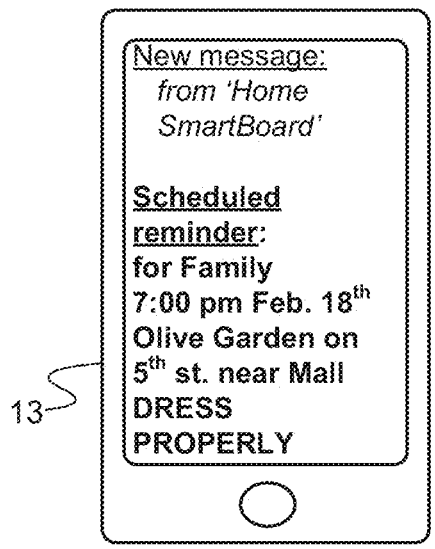

FIG. 5B shows a second example in which a hand-written command for creating a scheduled reminder is input on the tablet-type user device 19. In a first instance, the user writes the command "#Family dinner" on the tablet-type user device 19 to create a scheduled reminder entitled "Family Dinner", along with the message content "7:00 pm February 18th, Olive Garden on 5th st. near Mall, DRESS PROPERLY, @family." Input data storing the user's hand-writing is transmitted to the application server (25, 31) where the command and additional content are recognized. In addition to the command for creating a scheduled reminder, the additional content includes a second command for sharing the reminder with the recipients identified by the nickname or group "family." A confirmation message is received from the application server (25, 31) at the user device 19, and is displayed on the user device 19 in a second instance. The user does not issue any corrective input and, as a result, the application server (25, 31) adds the scheduled reminder to the user's calendar and, in accordance with the second command, sends a new message to the mobile stations 13 of all members of the group "family" and including the scheduled reminder.

Figure 5C:
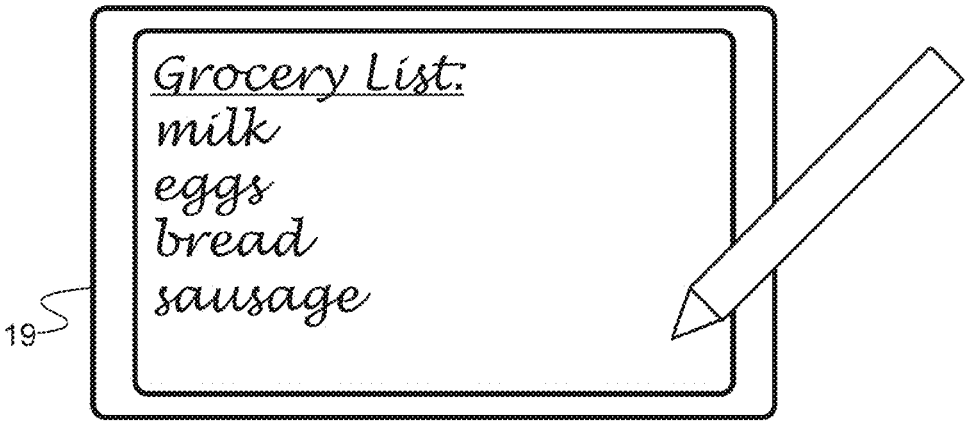
Figure 5C:
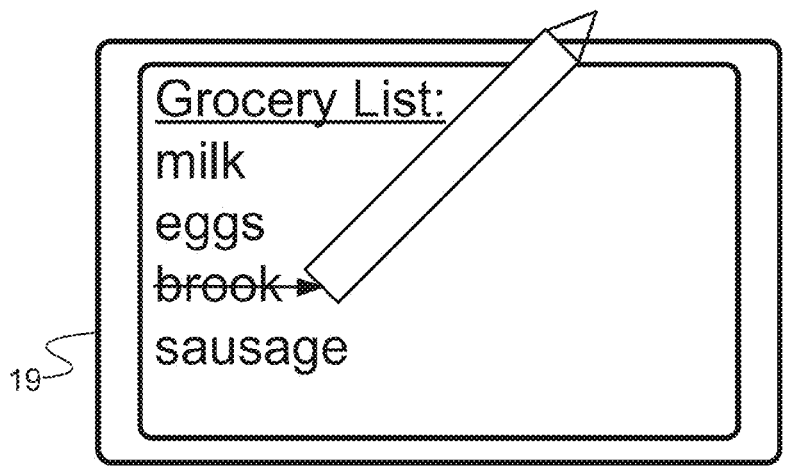
Figure 5C:
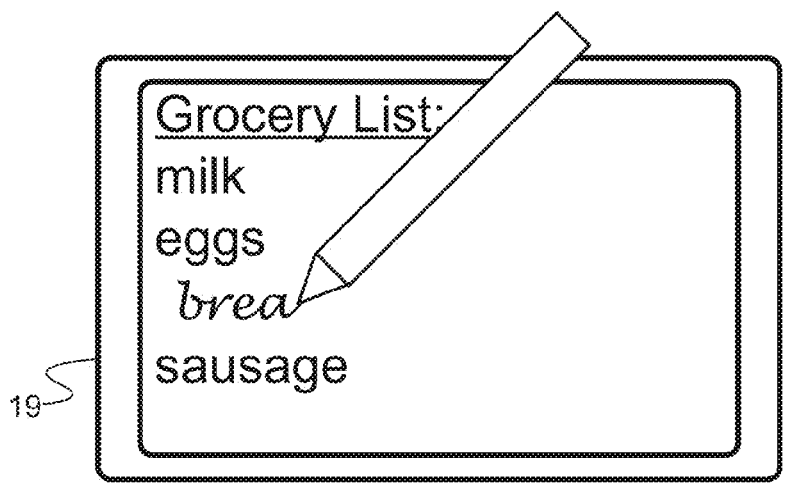

FIG. 5C shows a third example in which a hand-written command for creating a checklist is input on the tablet-type user device 19. The user writes the command "Grocery list:" on the tablet-type user device 19 in order to create a new checklist or note entitled "Grocery list," and writes additional content including a list of items to include in the checklist. The hand-writing input data storing the command and additional content is transmitted from the user device 19 to the application server (25, 31), and stored in the application server (25, 31) in association with metadata storing identification of the user device 19 from which the hand-writing input data was received and time-stamp(s) indicative of a time at which the hand-writing input data was obtained in the user device 19 and/or received in the application server (25, 31). In the application server (25, 31), the hand-writing input data is processed to identify characters and/or attributes contained therein, and to identify the command for creating a new checklist and the additional content including the list of items. The identified characters, attributes, and command are stored by the application server (25, 31) as metadata with the hand-writing input data. In addition, in response to the user's input, the application server (25, 31) generates a confirmation message which is received in the user device 19 and is displayed on the user device 19. The confirmation message, however, includes an error in one of the items to be included in the checklist. The user issues a corrective input, for example by crossing out the erroneous item with an eraser end of a stylus, in order to notify the user device 19 and application server (25, 31) of the error in the confirmation message data. The erroneous item in the confirmation data is removed from the list based on the user's corrective input, and the user can then hand-write the corrected item on the user device 19. The corrected hand-writing is then transmitted to the application server (25, 31) to be processed such that the correct item can be added to the checklist and the correct metadata can be stored in association with the hand-writing input data in the application server (25, 31). Once the checklist is corrected, the checklist may be transmitted to mobile station(s) of users associated with the tablet-type user device 19.

Figure 5D:
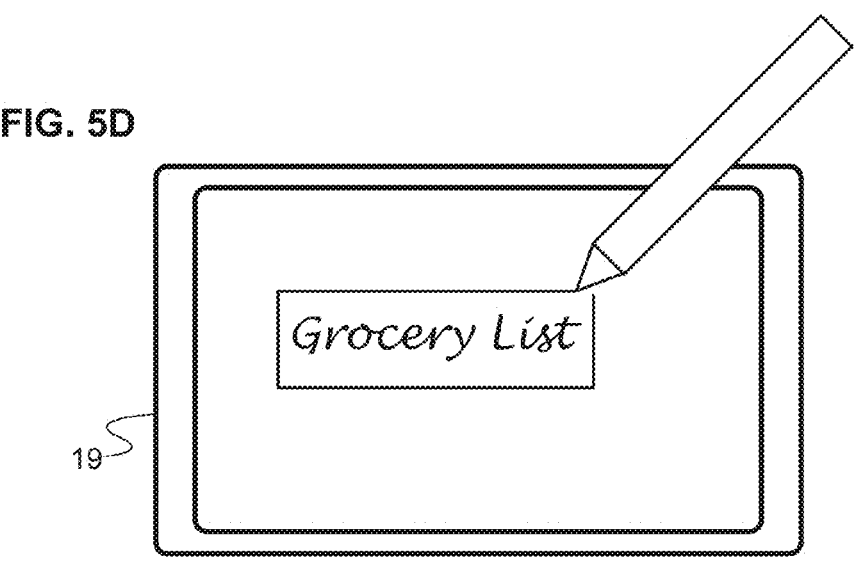
Figure 5D:
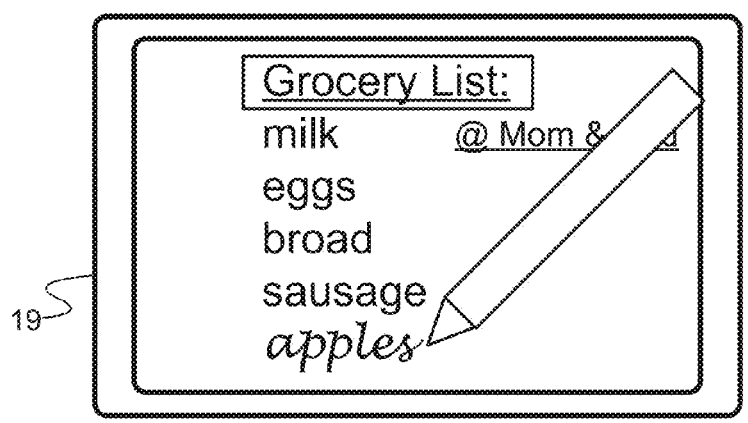
Figure 5D:
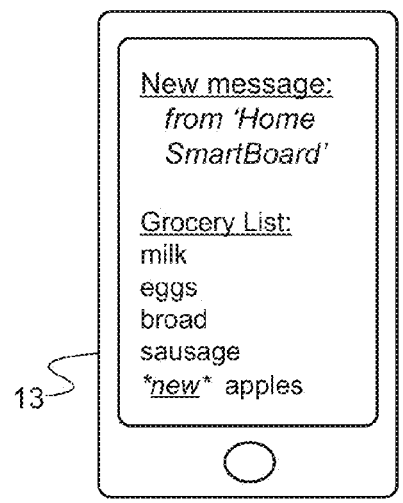

FIG. 5D shows a fourth example in which a hand-written command for retrieving a checklist or note is entered. The user writes the title "Grocery List" of a checklist on the user device 19, and issues a command by drawing a box around the title. The user's hand-writing input data is transmitted to the application server (25, 31), which recognizes the checklist retrieval command. The application server (25, 31) searches for and retrieves a checklist entitled "Grocery List" from the memory associated with the user device 19 from which the command was received. In particular, the application server (25, 31) may search through the metadata associated with hand-writing input data received from the user device 19. The search may include searching for any metadata identifying commands for creating or editing a checklist or note entitled "Grocery List." Once a matching checklist is identified and retrieved, the application server (25, 31) transmits the data for the retrieved checklist to the user device 19 in the confirmation message. The checklist is displayed on the user device 19, along with identification of recipient(s) "@Mom & Dad" with whom the checklist is automatically shared. Once displayed, the user can edit the checklist on the user device 19, for example by adding new item(s) to the checklist or removing item(s) from the checklist. Any edits to the checklist are automatically transmitted to the application server (25, 31) and, in turn, are automatically shared with the recipient(s) with whom the checklist is automatically shared. As shown, in response to the user adding the item "apples" to the checklist, an update is sent to the mobile stations of the recipient(s) "@Mom & Dad" with the updated checklist information.

In addition, if a recipient updates or adds an item to the checklist on the recipient's mobile station 13, the mobile station transmits the update or addition to the application server (25, 31) which, in turn, transmits the update or addition to the user device 19 so that the display of the checklist on the user device 19 can be updated with the new information. Similarly, if a recipient changes or updates a scheduled reminder received from the application server (25, 31), a notification of the change or update to the scheduled reminder may be provided to the application server (25, 31) which, in turn, transmits the change or update to the user device 19 so that the display of the scheduled reminder on the user device 19 can be updated.

The hand-written command processing service under consideration here may be delivered using tablet-type user devices 19. Implementation of the service will involve at least some execution of programming in the user devices 19, as well as implementation of user input/output functions thereon and data communications through the networks (15, 23, 29) with the application server (25, 31).

Figure 6:
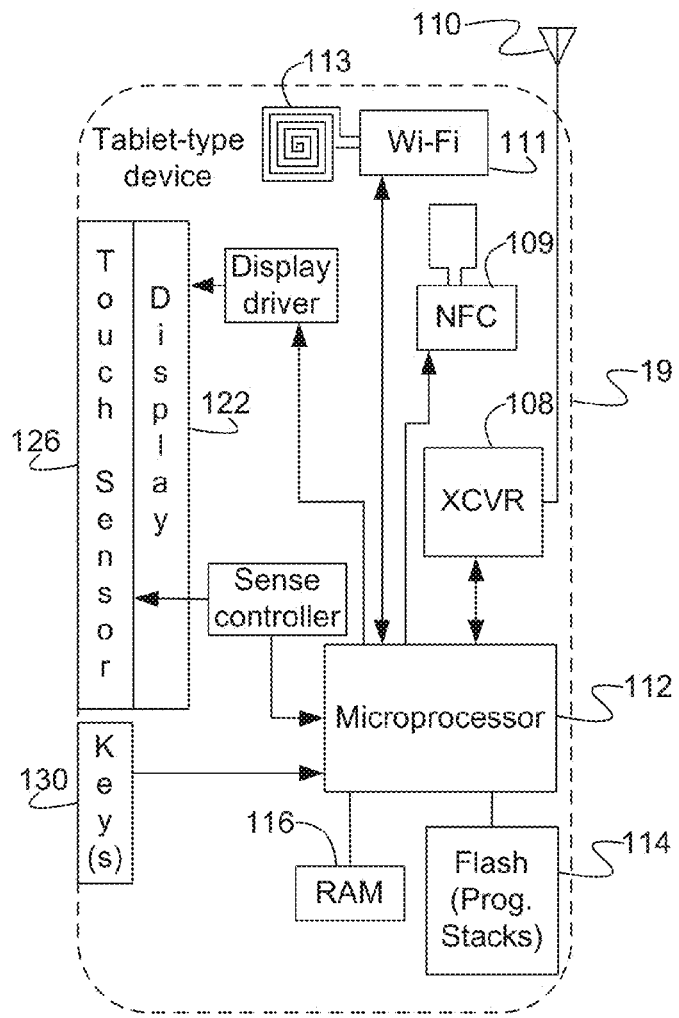
FIG. 6 is a high-level functional block diagram of an exemplary tablet-type user device as may be used in providing the hand-written command processing service through a network/system like that shown in FIG. 1.

For purposes of such a discussion, FIG. 6 provides a block diagram illustration of an exemplary tablet-type user device 19. For digital wireless communications, the user device 19 includes at least one of a digital transceiver (XCVR) 108 and a Wi-Fi transceiver (111). The user device 19 may in some embodiments also be capable of operation through a wired network communication interface (not shown). The transceivers (108, 111) provide two-way wireless communication of information in accordance with the technology of the respective networks (15, 23). The transceiver 108 also sends and receives a variety of signaling messages in support of the various data and communication services provided via the mobile communication network 15. Each transceiver (108, 111) connects through RF send and receive amplifiers (not separately shown) to a respective antenna (110, 113). The transceiver 108 may also support various types of mobile messaging services, such as short message service (SMS), enhanced messaging service (EMS), and/or multimedia messaging service (MMS).

The user device 19 includes a display 122 for displaying messages, menus or the like, as well as hand-writing input data obtained from a user. In one example, the display 122 requires power to change or update the display, but can stay on and display static content without requiring any power. In general, the display 122 may form part of a touchscreen display that includes a touch sensor 126 operative to receive input including hand-writing input data from a user. The display 122 displays information to the user and can detect occurrence and location of a touch on the area of the display using sensor 126. The touch may be an actual touch of the display device with a finger, stylus or other object, although at least some touchscreens can also sense when the object is in close proximity to the screen. Use of a touchscreen display as part of the user interface enables a user to interact directly with the information presented on the display. The device 19 can further include a keypad 130 to receive input from the user. The display 122 and sensor 126 are the physical elements providing a graphical user interface for inputting hand-written information. Of course, additional or alternative user interface elements may be used, such as a trackball.

A microprocessor 112 serves as a programmable controller for the user device 19, in that it controls all operations of the user device 19 in accord with programming that it executes, for all normal operations, and for operations involved in the hand-written command processing service under consideration here. The user device 19 includes flash type program memory 114, for storage of various "software" or "firmware" program routines and configuration settings for execution by the microprocessor 112. The user device 19 may also include a non-volatile random access memory (RAM) 116 serving as a working data processing memory. Of course, other storage devices or configurations may be added to or substituted for those in the example. The memories 114, 116 also store various data, such as server addresses and hand-writing input data, application data, and various data input by the user.

In various examples, the user device 19 may include additional elements not shown in FIG. 6. In general, the user device 19 includes a battery (not shown) for powering operation of the device. The user device 19 may optionally include a camera and/or microphone, and other accessories.

As discussed above, functions relating to the hand-written command processing service are implemented on servers and other computers connected for data communication via one or more packet data networks and operating as application server (25, 31) of FIG. 1. Although special purpose devices may be used, such servers may be implemented using one or more hardware platforms intended to represent a general class of data processing device commonly used to run "server" programming.

Figure 7:
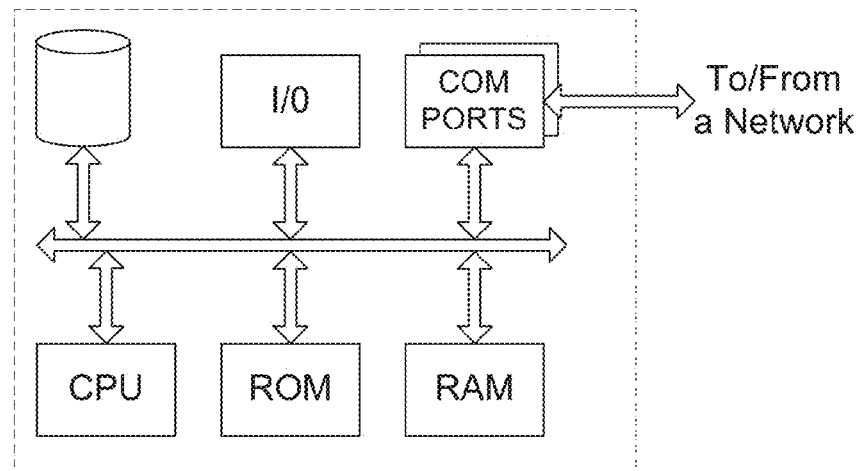
FIG. 7 is a simplified functional block diagram of a computer that may be configured as an application server, for example, to function as the application server in the system of FIG. 1.

FIG. 7 is a functional block diagram illustrations of a general purpose network or host computer platform, as may typically be used to implement a server. A server includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   receiving, by an application server, from a user device communicatively coupled via a communication network to the application server, data storing hand-written information obtained from a user of the user device;
   identifying, by the application server, a first gap in the received data storing the hand-written information and a second gap in the received data storing the hand-written information, the second gap being subsequent to the first gap;
   processing, by the application server, in response to the identifying of the second gap, a portion of the received data storing the hand-written information that is between the first gap and the second gap to identify one or more hand-written characters included in the portion of the received data that is between the first gap and the second gap;
   determining, by the application server, based on the identified one or more hand-written characters, whether the identified one or more characters include a command for initiating an action across the communication network; and
   responsive to determining that the identified one or more characters include the command, automatically performing, by the application server, the action identified by the command included in the one or more hand-written characters across the communication network.

2. The method of claim 1, wherein the hand-written information corresponds to information written on the user device by the user wanting to send a message, create a scheduled reminder, or store a checklist or note, and
   wherein the automatically performing the action comprises at least one of:
      generating and sending a messaging service message or an e-mail message to at least one recipient identified by the one or more hand-written characters;
      creating a scheduled reminder based on information included in the one or more hand-written characters; and
      creating and storing a checklist or note based on information included in the one or more hand-written characters.

3. The method of claim 1, wherein the automatically performing the action comprises:
   identifying a checklist or note previously stored by the application server based on information included in the one or more hand-written characters;
   retrieving the identified checklist or note from memory; and
   transmitting the retrieved checklist or note from the application server to the user device for display to the user.

4. The method of claim 1, further comprising:
   responsive to determining that the identified one or more characters include a command and prior to automatically performing the action, generating and transmitting to the user device a confirmation message including the identified command, wherein the action is automatically performed only upon determining that no corrective command is received from the user device within a predetermined time-period following the transmitting of the confirmation message.

5. The method of claim 4, wherein the confirmation message includes the identified one or more hand-written characters and the command, and
   wherein the confirmation message further identifies, from among a plurality of data received from the user device and storing hand-written information, the processed data from which the characters and command were identified.

6. The method of claim 1, wherein the automatically performing the action identified by the command comprises causing in the application server a message to be transmitted through a mobile wireless communication network to a mobile station of a recipient identified by the hand-written characters.

7. The method of claim 1, wherein the user device is a tablet-type user device, and the received data stores hand-written information obtained from the user through an input interface of a display of the tablet-type user device.

8. A system comprising:
   a communication network providing data communication services to a user device communicatively coupled thereto; and
   an application server communicatively coupled to the communication network and configured to:
      receive, from the user device via the communication network, data storing hand-written information obtained from a user of the user device;
      identify a first gap in the received data storing the hand-written information and a second gap in the received data storing the hand-written information, the second gap being subsequent to the first gap;
      process, in response to the identifying of the second gap, a portion of the received data storing the hand-written information that is between the first gap and the second gap to identify one or more hand-written characters included in the portion of the received data that is between the first gap and the second gap;
      determine, based on the identified one or more hand-written characters, whether the identified one or more characters include a command for initiating an action across the communication network; and
      responsive to determining that the identified one or more characters include the command, automatically perform the action identified by the command included in the one or more hand-written characters across the communication network.

9. The system of claim 8, wherein the hand-written information corresponds to information written on the user device by the user wanting to send a message, create a scheduled reminder, or store a checklist or note, and
   wherein the application server is configured to automatically perform the action by performing at least one of:
      generating and sending a messaging service message or an e-mail to at least one recipient identified by the one or more hand-written characters;
      creating a scheduled reminder based on information included in the one or more hand-written characters; and
      creating and storing a checklist or note based on information included in the one or more hand-written characters.

10. The system of claim 8, wherein the application server is configured to automatically perform the action by:
   identifying a checklist or note previously stored by the application server based on information included in the one or more hand-written characters;
   retrieving the identified checklist or note from memory; and
   transmitting the retrieved checklist or note to the user device for display to the user.

11. The system of claim 8, wherein the application server is further configured to:
   responsive to determining that the identified one or more characters include a command and prior to automatically performing the action, generate and transmit to the user device a confirmation message including the identified command,
   wherein the application server automatically performs the action only upon determining that no corrective command is received from the user device within a predetermined time-period following the transmitting of the confirmation message.

12. The system of claim 11, wherein the confirmation message includes the identified one or more hand-written characters and the command, and
   wherein the confirmation message further identifies, from among a plurality of data received from the user device and storing hand-written information, the processed data from which the characters and command were identified.

13. The system of claim 8, wherein the application server is configured to automatically perform the action identified by the command by causing a message to be transmitted through a mobile wireless communication network to a mobile station of a recipient identified by the hand-written characters.

14. The system of claim 8, wherein the user device is a tablet-type user device, and the received data stores hand-written information obtained from the user through an input interface of a display of the tablet-type user device.

15. A method comprising:
   displaying, by a user device, hand-written information received from a user through a user-input interface of the user device;
   identifying, by the user device, a first gap in the received hand-written information and a second gap in the received hand-written information, the second gap being subsequent to the first gap;
   transmitting, by the user device in response to the identifying of the second gap in the hand-written information, to an application server communicatively coupled via a communication network to the user device, data storing a portion of the hand-written information that is between the first gap and the second gap;
   receiving, by the user device in response to transmitting the data storing hand-written information, from the application server, a confirmation message including a command identified from hand-written characters included in the portion of hand-written information between the first gap and the second gap;
   identifying, by the user device, at least a portion of the hand-written information displayed on the user device and corresponding to the hand-written characters from which the command is identified; and
   removing, by the user device, from display on the user device the identified portion of the hand-written information displayed on the user device.

16. The method of claim 15, further comprising:
   in response to the identifying of the at least the portion of the hand-written information displayed on the user device and corresponding to the hand-written characters from which the command is identified, displaying on the user device the command included in the confirmation message, wherein the command is displayed at a location on the user device from which the identified portion of the hand-written information is removed.

17. The method of claim 15, further comprising:

displaying on the user device the command included in the confirmation message; and in response to the displaying of the command, receiving through the user-input interface of the user device a corrective input indicative of an error in the displayed command.

18. The method of claim 17, further comprising:

in response to receiving the corrective input, transmitting from the user device to the application server a corrective command indicative of the error in the displayed command.

19. The method of claim 1, wherein the identifying of the second gap in the received data storing the hand-written information comprises at least one of:

determining that the user does not input any hand-written information for at least a predetermined amount of time that follows the first gap; and determining that the user stops writing on a first region of a user-input interface of the user device and then begins writing on a second region of the user-input interface.

20. The system of claim 8, wherein the application server identifies the second gap in the received data storing the hand-written information in the received data storing hand-written information by at least one of:

determining that the user does not input any hand-written information for at least a predetermined amount of time that follows the first gap; and determining that the user stops writing on a first region of a user-input interface of the user device and then begins writing on a second region of the user-input interface.

* * * * *